(12) United States Patent
Roessler et al.

(10) Patent No.: US 11,544,027 B2
(45) Date of Patent: Jan. 3, 2023

(54) METHOD OF MANUFACTURING PRINT PRODUCTS BY DIGITAL IDENTIFICATION OF MATCHING PRINT SHOPS

(71) Applicant: HEIDELBERGER DRUCKMASCHINEN AG, Heidelberg (DE)

(72) Inventors: Georg Roessler, Angelbachtal (DE); Dominic Stahl, Mauer (DE); Bernhard Wagensommer, Malsch (DE); Gottfried Grasl, Angelbachtal (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 17/392,880

(22) Filed: Aug. 3, 2021

(65) Prior Publication Data
US 2022/0066717 A1 Mar. 3, 2022

(30) Foreign Application Priority Data
Aug. 28, 2020 (DE) ..................... 10 2020 122 548.2

(51) Int. Cl.
*G06F 3/12* (2006.01)
(52) U.S. Cl.
CPC .......... *G06F 3/1272* (2013.01); *G06F 3/1204* (2013.01); *G06F 3/1243* (2013.01); *G06F 3/1275* (2013.01); *G06F 3/1287* (2013.01)
(58) Field of Classification Search
None
See application file for complete search history.

(56) References Cited

U.S. PATENT DOCUMENTS

| 5,897,260 A | 4/1999 | Zingher | |
|---|---|---|---|
| 2003/0231337 A1* | 12/2003 | Nishimura | G06F 3/1285 358/1.15 |
| 2012/0173332 A1* | 7/2012 | Hayami | G06Q 30/0251 705/14.49 |

(Continued)

FOREIGN PATENT DOCUMENTS

| DE | 19522053 A1 | 12/1996 |
|---|---|---|
| EP | 0878303 A2 | 11/1998 |

*Primary Examiner* — Frantz Bataille
(74) *Attorney, Agent, or Firm* — Laurence A. Greenberg; Werner H. Stemer; Ralph E. Locher

(57) ABSTRACT

A method of manufacturing print products uses a computer and a printing or further processing machine with a network connection. A customer-requested print product is compared to digital print product models on the computer, and the best matching digital print product model is selected by the computer from the comparison between the saved digital print product models and the customer-requested print product. The computer checks digital print shop models for compatibility with the selected digital print product model, compares the digital print shop model selected as suitable to saved preference models of actual print shops and selects matching preference models of actual print shops for producing the customer-requested print job. After the customer's computer selects at least one suitable actual print shop, the customer-requested print job is produced on at least one printing or further processing machine of the print shop selected by the customer.

10 Claims, 1 Drawing Sheet

(56) References Cited

U.S. PATENT DOCUMENTS

2012/0218594 A1* 8/2012 Komine ............... G06F 3/1241
358/1.15
2014/0200858 A1 7/2014 Chatow et al.
2014/0244422 A1 8/2014 Giannetti et al.

* cited by examiner

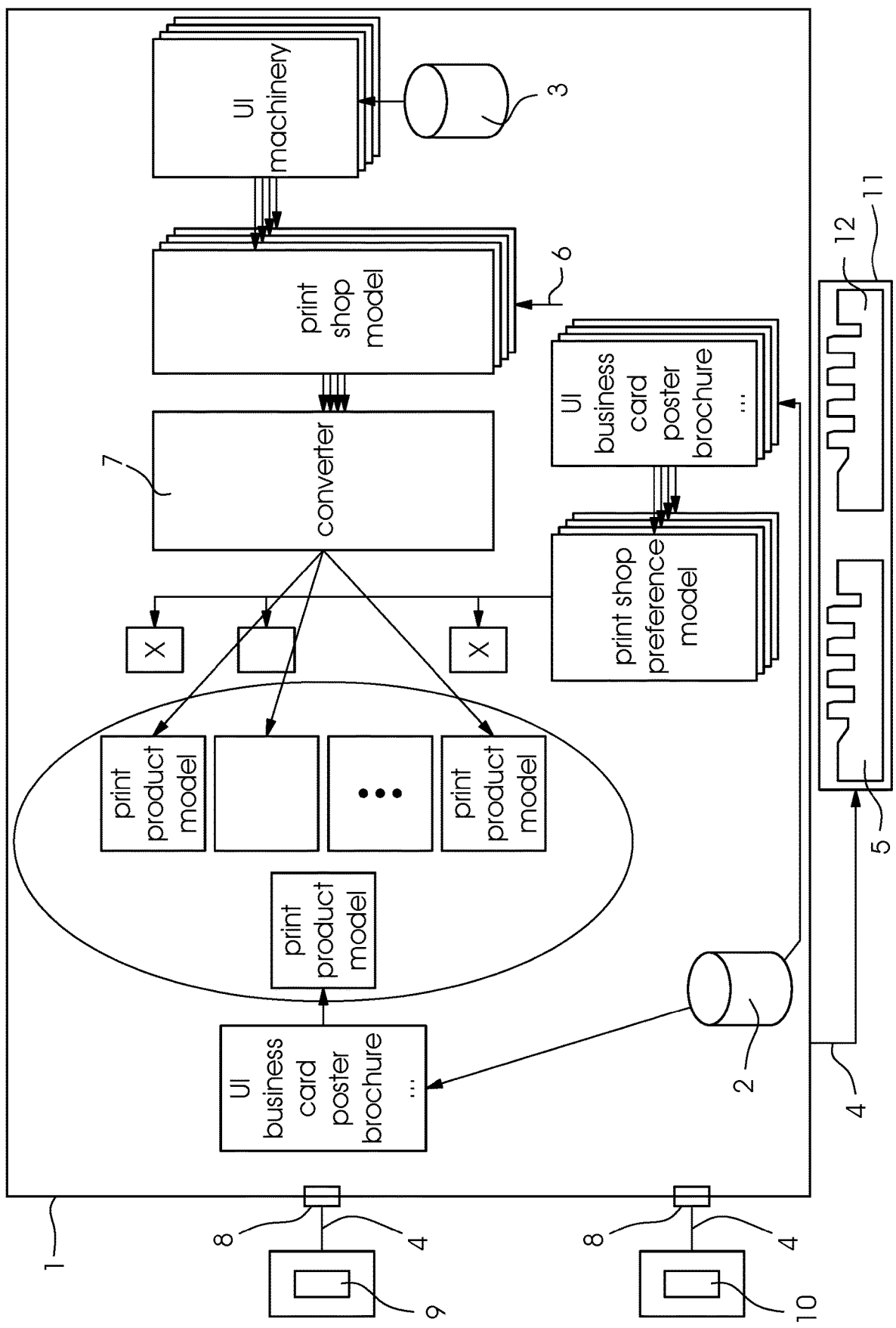

METHOD OF MANUFACTURING PRINT PRODUCTS BY DIGITAL IDENTIFICATION OF MATCHING PRINT SHOPS

CROSS-REFERENCE TO RELATED APPLICATION

This application claims the priority, under 35 U.S.C. § 119, of German Patent Application DE 10 2020 122 548.2, filed Aug. 28, 2020; the prior application is herewith incorporated by reference in its entirety.

BACKGROUND OF THE INVENTION

Field of the Invention

The present invention relates to a method of manufacturing print products by using at least one computer and at least one printing machine, in which the computer and the printing machine are connected to one another by a network connection.

The present invention deals with the problem of bringing print jobs and suitable print shops with their machinery together and vice versa. With the procedures and methods available today, that is difficult to achieve. The current digital workflow in the printing industry and in particular in the print shops is configured to consider print jobs as a given. The capabilities of a print shop are analyzed to find whether a customer's print job may be processed in the print shop. If that is the case, the print shop calculates a price for the print job. A considerable disadvantage of that process is that the entire printing and manufacturing process is viewed exclusively from the starting point of a customer's print job, which means, for instance, that the print shop does not have any option to increase the utilization time of their machinery by selecting suitable print jobs.

BRIEF SUMMARY OF THE INVENTION

It is accordingly an object of the invention to provide a method of manufacturing print products by digital identification of matching print shops, which overcomes the hereinafore-mentioned disadvantages of the heretofore-known methods of this general type and which, in particular, assigns as many matching print jobs as possible to a print shop for the print jobs to be processed by the machinery of the print shop.

With the foregoing and other objects in view there is provided, in accordance with the invention, a method of manufacturing print products by using at least one computer and at least one printing machine or further processing machine, and a network connection connecting the computer and the printing machine or further processing machine, which comprises, in a first step, a print product requested by a customer is compared to digital models of print products saved on the computer, and the digital model of print products which is the best match is selected by the computer as a result of the comparison between the saved digital models of print products and the print product requested by the customer, in a second step, the computer checks digital models of print shops for compatibility with the selected digital model of the print product, compares the digital models of print shops selected as suitable to saved preference models of actually existing print shops and selects matching preference models of actually existing print shops for the production of the print job requested by a customer, and after at least one actual print shop that has been deemed suitable has been selected by a computer of the customer, the print job requested by the customer is produced on at least one printing machine or further processing machine of the print shop selected by the customer.

Advantageous embodiments of the present invention will become apparent from the dependent claims, the description, and the drawing.

The invention focuses on a so-called converter, which assigns models of print products to models of print shops, thus ensuring that as many print jobs as possible may be assigned to a print shop and that no print jobs slip under the radar. Accordingly, a first step of the method of the invention is to compare a print product a customer requested with a digital model of print products saved on a computer. Thus in the first step, an actual print product requested by a customer is compared to modeled digital print products. In the comparison between the saved digital models of print products and the print product requested by the customer, the digital model of print products that is the best match is automatically selected by the computer. In this process, the digital models are limited and therefore, rare jobs are excluded. Thus these comparisons do not require a print shop owner's nor a customer's intervention; it is an automated process on a computer.

The second step is tackled from the point of view of the print shops: the computer checks digital models of print shops for compatibility with the selected digital model of the print product and compares the digital models of print shops that have been selected as compatible to saved preference models of actually existing print shops. Thus initially all digital models of print shops that match the digital model of the print product are correlated and the matching digital models of the print shops are saved on the computer. Then the digital models of print shops that have been selected as compatible in this process are in turn compared to saved preference models of actually existing print shops, and matching preference models of actually existing print shops are selected by the computer to produce the print job requested by the customer. Thus in this step, all actually existing print shops that are capable of manufacturing a print product requested by a customer are identified. Among these actually existing print shops, the computer may then choose the print shop that will process the print job requested by the customer on at least one printing machine. It is either the customer who may directly make the choice by selecting a specific actual print shop that has been identified as a match or it is the computer that makes the choice of the actual print shop and initiates the processing of the print job on the basis of specific preferences the customer has specified, for instance particularly low costs or a fast manufacturing process.

The method of manufacturing print products in accordance with the invention requires that the participating print shops, the computer for completing the process steps, and the customer with the print product are connected to one another and communicate through a data network such as the internet. The computer and the steps of the invention may operate in a decentralized manner on the Internet in the context of a cloud computing solution. It is understood, however, that the computer may be disposed at a central location and communicate with the other participants likewise through the Internet. The method of the invention ensures that a customers' print jobs and print shops are matched in an optimized way, factoring in the compatibility of print shops and print jobs by taking all possible pairings between print jobs and print shops into consideration. Any vagueness that may occur in this process may be factored in by using tolerances that are saved in the digital models of the print product and in the digital models of the print shops.

A first embodiment of the present invention envisages that the computer has access to a database containing print products a customer may select. This database may be part of the computer or it may be located at any desired location connected to the computer through an Internet connection. The database contains print products customers may select; thus customers are not completely free to choose any desired print product, but rather restricted from the start to print products that make sense. This makes a matching of print jobs and print shops much easier. In this way, so-called exotic print jobs may in particular be avoided because customers are not completely free to configure their print jobs in any way they like. The print products customers may select may in particular be saved in the form of templates with specific parameters and parameter ranges.

A further embodiment of the present invention envisages that the digital model of a print shop has access to a database in which digital machine data of printing machines and other machinery of the printing industry have been saved. When the digital models of a print shop are created, it does not make sense to create digital models that may not be reproduced by machinery that actually exist. Thus it is advantageous if the digital model of the print shop only contains machinery that actually exist in real life. For this purpose, the digital model of a print shop is formed of machine data of actually existing printing machines by the manufacturers that are actually active in the market. The data are available in the form of a database. In this case, too, the database may be part of the computer but it may also be separate and connected through the Internet and potentially it may be in the same location as the database containing the print products customers may select.

Advantageously, it is furthermore envisaged for the print product database to be filled with digital data of print products from print shops. In this case the database of the print products is only filled with digital data of print jobs which actually existing print shops really want to process. The print shops only send the print products that they are willing to accept to the database. In this case, the customer may not choose exotic print jobs which it does not make sense for the participating print shops to process for economical or technical reasons. This embodiment of the invention likewise primarily aims at eliminating print jobs which do not make sense right from the start.

A further embodiment of the method of the invention envisages that print shops connected to the computer send digital preference models through a network connection. The digital preference models of the print shop contain data on print jobs which the print shops in question are capable of processing and willing to process. This allows the print shops to exclude print jobs on the basis of their economic preferences, for instance, and right from the start, namely print jobs which they might process on their machinery but do not want to process for economic reasons, for example. This means that print shops may simply ignore models of undesired print products in the conversion. The print shops may likewise transmit their digital preferences to the computer through the Internet.

In accordance with another advantageous feature, printing machine manufacturers and manufacturers of other machinery of the printing industry may transmit the digital data of their machinery to the database of printing machines. In this way, the database for printing machines always contains the current and actually available printing machines and other machinery in the printing industry, ensuring that the currently and actually available machinery is factored in when a digital model of a print shop is created to prevent compatibility problems from occurring when the print jobs are processed on the actually existing machinery.

A further embodiment of the present invention envisages that the digital model of the print product contains information such as product type, page sizes, colors, finishing, paper surface, grammage, page number, or a further processing step. With the technical information that has been provided, the digital model of the print product may be represented in a relatively accurate and realistic way so that all production steps required to manufacture the print product are factored into the model. By mapping the properties of the digital print shop models to the digital models of the print products, the converter may now actually match print products and print shops to ensure that the print jobs may be processed without any problems in the real world.

In accordance with a further feature, the computer may be provided with interfaces for connecting computers in actually existing print shops or brokerages and computer or browser applications of print shop customers through an Internet connection. Such Internet interfaces and connections may be used to integrate the actually existing print shops or brokers and the customers with their print jobs into the method of the invention to be able to match print jobs and print shops in the best possible way. The Internet interfaces make this integration easy to implement on any web-enabled device using a browser portal. It is therefore not necessary for a print shop or customer to install software in the form of a program or application. Instead, a customer may access the method of the invention and thus profit from its advantages through a web browser and a log-in with user name and password.

Other features which are considered as characteristic for the invention are set forth in the appended claims.

Although the invention is illustrated and described herein as embodied in a method of manufacturing print products by digital identification of matching print shops, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The figure of the drawing is a block diagram illustrating the components involved in the method of the invention on the basis of an example of a customer and a print shop.

DETAILED DESCRIPTION OF THE INVENTION

Referring now in detail to the single figure of the drawing, it is seen that the focal point is a computer 1, which completes the method of the invention by using software. The computer 1 may be in a central location or decentralized; in particular, it may be part of a cloud computing solution. In any case, the computer 1 has hardware and/or software interfaces 8 for communicating through Internet connections 4 with all that participate in the method of the invention. In this way, the computer 1 is connected to the computer 9 of a broker, to the computer 10 of a customer, and to a printing machine 5 and a folder 12 in a print shop 11.

The processes and steps shown inside the computer 1 in the figure are at the center of the method of the invention. The computer 1 has access to a database 2 for print products and to a database 3 for printing machines and further printing industry machinery. The database 2 for print products contains all possible print products that occur in real life and may be represented in expedient templates. This in turn means that the database 2 for print products does not contain any special custom-made products if they are not regularly requested. A customer may use the computer 10 to select the print product he or she wants from the database 2.

On the other side of a converter 7, there are digital models of print shops 11, which are created through digital data from an ERP system 6 such as SAP. In addition, the machinery of actually existing print shops 11 may be compiled through the database 3 for printing machines by accessing the machinery saved in the database 3. In this way, digital models of print shops 11 may be created. Furthermore, the print shops 11 may provide so-called preference models, i.e. they may indicate preferences for specific print jobs and exclude undesired print jobs, for example. These preferences prevent print shops 11 from being allotted print jobs which a print shop may process from a technical point of view but which do not make sense from an economical point of view.

Once customers have selected a print job on their own computer 10, the computer 1 compares the print job to digital models of print products. Due to the saved preference models of the print shops 11, the customer's print job is saved only with digital models that actually match the preferences of the print shops 11. Depending on the preference models, digital models of print products, and the print product selected by the customer, there may be no match, one match, or multiple matches. Customers may then select all matching digital models of print products on their computers 10.

The mapping of digital print products to the digital models of print shops 11 is done through the converter 7, factoring in the saved preferences of the print shops 11. In this process, applying the preferences, the characteristics of the digital print products are compared to the digital properties of the digital models of the print shops 11 and only matching digital models of print products are selected. In the end, a customer having the computer 10 may select the appropriate print shop themselves on their computers, causing the print jobs to be sent to the printing machine 5 of the selected print shop for processing. The converter 7 is responsible for mapping the digital models of print products to the digital models of the print shops 11 on the basis of the characteristics of print jobs and printing machines 5 and further processing machines such as folders 12. In this process, for instance the page size and the printing substrate of the print job are factored in and represented in a 1-on-1 logic.

For colors, varnish, folding patterns and other complicated characteristics that a print job may have, the converter 7 relies on a complex mapping logic. Thus, the colors are initially subdivided into so-called scales and special colors, which are then mapped to the number of printing units in a printing machine 5. In this process, the position of the turning device in printing machines 5 for straight printing and perfecting are likewise factored in. For varnishing, a distinction is made between a printing unit for varnishing and an all-over varnish applied in the varnishing unit.

The folding patterns for folders 12 are likewise mapped to the configuration of the respective folder 12. The folding patterns in turn may be deduced directly from the position of the turning device and the number of printing units. What can be seen is that the converter 7 thus matches the digital models of the print jobs with the digital models of the printing machines 5 and further processing machines and converts them into one another, thus being able to confirm possible digital models of print jobs that may actually be processed on the digital models of print shops 11.

In addition, it is possible for the customer having the computer 10 to have already left specifications, for instance "choose the most cost-efficient print shop 11," so that the computer 1 may automatically select the most cost-efficient print shop 11 and forward the print job to the printing machine 5 of this print shop 11. For this purpose, the cost structure is included in the digital model of the print shop 11. This allows customers' print jobs and print shops to be matched in an optimum way. In the end, the customers may make a selection among the print shops 11 in accordance with their preferences. This provides a fully automated way of handling jobs between customer and print shop 11.

The following is a summary list of reference numerals and the corresponding structure used in the above description of the invention:

1 computer
2 print products database
3 machinery database
4 internet connection
5 printing machine
6 ERP system
7 converter
8 interface
9 computer at the broker's location
10 computer at the customer's location
11 print shop
12 folder

The invention claimed is:

1. A method of manufacturing print products by using at least one computer, at least one printing machine or further processing machine, and a network connection connecting the computer and the printing machine or further processing machine, the method comprising:

in a first step:
comparing a print product requested by a customer to digital models of print products saved on the computer, and
using the computer to select a digital model of print products being a best match, as a result of the comparison between the saved digital models of print products and the print product requested by the customer;

in a second step:
using the computer to check digital models of print shops for compatibility with the selected digital model of the print product,
using the computer to compare the digital models of print shops selected as suitable to saved preference models of actually existing print shops, and
using the computer to select matching preference models of actually existing print shops for production of the print job requested by the customer; and after using a computer of the customer to select at least one actual print shop found suitable, producing the print job requested by the customer on at least one printing machine or further processing machine of the print shop selected by the customer.

2. The method according to claim 1, which further comprises using the computer to access a database with print products selectable by the customer.

3. The method according to claim 1, which further comprises using the digital print shop model to access a database with saved digital machinery data of printing machines and other printing industry machinery.

4. The method according to claim 2, which further comprises filling the database of print products with digital data of print products from print shops.

5. The method according to claim 1, which further comprises transmitting digital preference models over the network connection from print shops connected to the computer.

6. The method according to claim 1, which further comprises implementing the computer in cloud software and connecting the computer to participating print shops over an Internet connection.

7. The method according to claim 2, which further comprises using manufacturers of printing machines and other printing industry machinery to transmit digital data of their machinery to the database for printing machines.

8. The method according to claim 1, which further comprises including information regarding at least one of product type, page size, colors, finishing, paper surface, grammage, page number or a further processing step, in the digital model of the print product.

9. The method according to claim 1, which further comprises using a converter to map characteristics of the digital print shop models to digital models of the print products.

10. The method according to claim 1, which further comprises providing the computer with interfaces for connecting computers in actually existing print shops or at a broker and computers or browser applications of customers of the print shops, by using an Internet connection.

* * * * *